(12) United States Patent
Fruehauf et al.

(10) Patent No.: US 8,143,582 B2
(45) Date of Patent: Mar. 27, 2012

(54) SCINTILLATOR DEVICE

(75) Inventors: Diane L. Fruehauf, Streetsboro, OH (US); Julie L. Collins, Ashtabula, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 327 days.

(21) Appl. No.: 12/466,202

(22) Filed: May 14, 2009

(65) Prior Publication Data

US 2009/0283688 A1 Nov. 19, 2009

Related U.S. Application Data

(60) Provisional application No. 61/053,312, filed on May 15, 2008.

(51) Int. Cl.
*G01T 1/202* (2006.01)
(52) U.S. Cl. .................................. 250/361 R
(58) Field of Classification Search .............. 250/361 R, 250/368
See application file for complete search history.

(56) References Cited

U.S. PATENT DOCUMENTS

| 4,004,151 | A | 1/1977 | Novak |
| 4,158,773 | A | 6/1979 | Novak |
| 4,383,175 | A | 5/1983 | Toepke |
| 4,764,677 | A | 8/1988 | Spurney |
| 6,839,362 | B2 | 1/2005 | Kokta et al. |
| 6,844,084 | B2 | 1/2005 | Kokta et al. |
| 2006/0091312 | A1* | 5/2006 | Saenger .................. 250/361 R |

OTHER PUBLICATIONS

Smalley Steel Ring Company "Spiral Retaining Rings and Wave Springs" Engineering and Parts Catalog, 2007, 112 pages.

* cited by examiner

*Primary Examiner* — David Porta
*Assistant Examiner* — Mark R Gaworecki
(74) *Attorney, Agent, or Firm* — Abel Law Group, LLP; Robert T. Conway

(57) ABSTRACT

A detector includes a scintillator crystal having a front face and a rear face, a backplate disposed proximal to the rear face of the scintillator crystal, and a biasing member disposed proximal to the backplate and applying a biasing force to the backplate. In turn, the backplate applies a biasing force to the scintillator crystal in a direction toward the front face. The biasing member comprises a single-turn, round-section wire wave spring.

19 Claims, 3 Drawing Sheets

SCINTILLATOR DEVICE

CROSS-REFERENCE TO RELATED APPLICATION(S)

The present application claims priority from U.S. Provisional Patent Application No. 61/053,312, filed May 15, 2008, entitled "SCINTILLATOR DEVICE," naming inventors Diane Fruehauf and Julie Collins which application is incorporated by reference herein in its entirety.

FIELD OF THE DISCLOSURE

The present disclosure, in general, relates to scintillators and in particular, to ruggedized scintillator devices for industrial applications.

BACKGROUND

Scintillation detectors have been employed in various industrial applications, such as the oil and gas industry for well logging. Typically, these detectors have scintillator crystals made of an activated sodium iodide material that is effective for detecting gamma rays. Generally, the scintillator crystals are enclosed in tubes or casings, which include a window permitting radiation induced scintillation light to pass out of the crystal package for measurement by a light-sensing device, such as a photomultiplier tube. The photomultiplier tube converts the light photons emitted from the crystal into electrical pulses that are shaped and digitized by associated electronics and that may be registered as counts and transmitted to analyzing equipment. In terms of well logging applications, the ability to detect gamma rays makes it possible to analyze rock strata as gamma rays are emitted from naturally occurring radioisotopes, typically of shales that surround hydrocarbon reservoirs.

Today, a common practice is to make measurements while drilling (MWD). For MWD applications, the detector should be ruggedized, that is, it should have a high shock resistance and be capable of withstanding high temperatures, while maintaining performance specifications for a reasonable lifetime.

A problem associated with MWD applications is that the detector reports a higher than actual count rate when the scintillation device detects false counts resulting from vibration. Falsely high readings may occur when the detector output is composed of radiation-induced counts and vibration-induced counts. Moreover, the problem is exaggerated when detecting low-level radiation events while the detector is subject to a severe operational environment, such as drilling.

Accordingly, the industry continues to seek improvements in scintillator devices, particularly ruggedized scintillator devices that can withstand the harsh environments of industrial applications, such as high shock and high temperature applications common in drilling. In addition, it is desirable to provide ruggedized scintillator devices that maintain performance over an extended lifetime.

SUMMARY

In a particular embodiment, a detector includes a scintillator crystal having a front face and a rear face, a backplate disposed proximal to the rear face of the scintillator crystal, and a biasing member disposed proximal to the backplate and applying a biasing force to the backplate. In turn, the backplate applies a biasing force to the scintillator crystal in a direction toward the front face. The biasing member comprises a single-turn, round-section wire wave spring.

In a further embodiment, a detector includes a scintillator crystal having a front face and a rear face, a backplate disposed proximal to the rear face of the scintillator crystal, and a biasing member disposed proximal to the backplate and applying a biasing force against the backplate. In turn, the backplate applies a biasing force to the scintillator crystal in a direction toward the front face of the scintillator crystal. The biasing member has a spring rate of at least 3000 lb/in and a load ratio of at least 0.7.

In an additional embodiment, a detector includes a housing defining a cavity and having a front end and a back end. The housing defines an opening in the front end, and the back end is closed. The detector further includes a window disposed within the opening of the front end of the housing and defining a light path from the cavity. In addition, the detector includes a scintillator crystal having a front face and a rear face. The front face is disposed proximal to and is biased toward the window. Further, the detector includes a reflector disposed on the rear face of the scintillator crystal, a backplate disposed proximal to the reflector, and a cushioning pad disposed between the backplate and the reflector. Also, the detector includes a biasing member disposed proximal to the backplate and applying a biasing force against the backplate toward the cushioning pad and the rear face of the scintillator crystal. The biasing member includes a single-turn, round-section wire and has a spring rate of at least 3000 lb/in and a load ratio of at least 0.7.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE EMBODIMENTS

According to a one aspect, a radiation detector is disclosed that includes a photomultiplier tube, and a scintillator device coupled to the photomultiplier tube. The scintillator device includes a scintillator crystal, a shock absorbing member substantially surrounding the scintillator crystal, and a casing substantially surrounding the shock absorbing member. The casing has a window in one end. Further, the scintillator device includes a biasing member to bias the scintillator crystal toward the window. In particular, the biasing member has a spring rate of at least 3000 lb/in and a load ratio of at least 0.7. In an example, the biasing member is a single-turn, round-wire wave spring.

Figure 1:
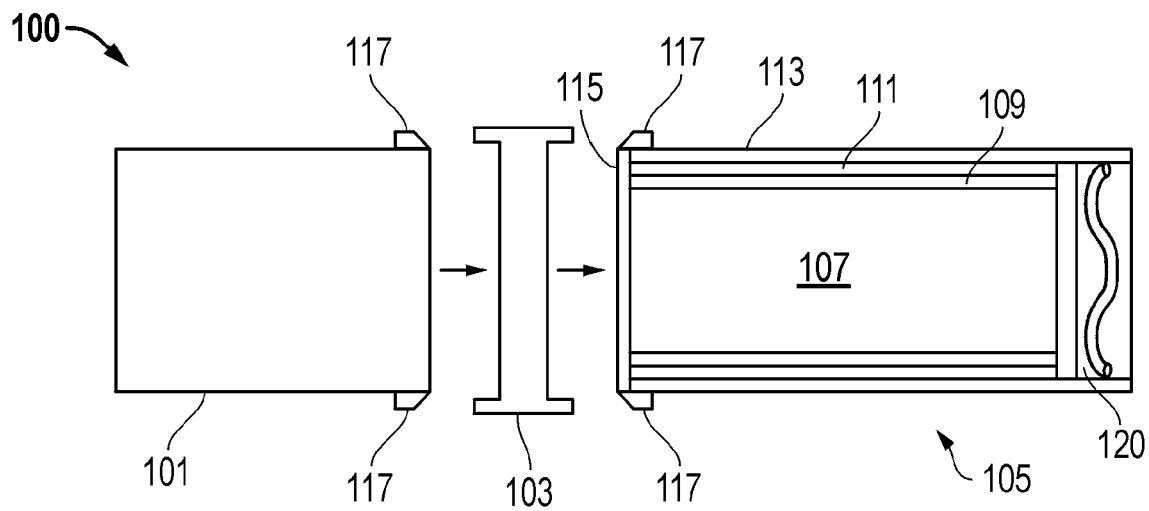
FIG. 1 includes an illustration of a detector according to one embodiment.

Referring to the figures, FIG. 1 illustrates a radiation detector 100 according to one embodiment. As illustrated the radiation detector includes a photosensor 101, light pipe 103, and a scintillator housing 105. As mentioned above, the scintillator housing 105 can include a scintillator crystal 107 disposed within and substantially surrounded by a reflector 109 and a shock absorbing member 111. The scintillator crystal 107, reflector 109, and the shock absorbing member 111 are housed within a casing 113 which includes a window 115 at one end of the casing 113. A biasing member 120 biases the scintillator crystal 107 toward the window 115.

In further reference to FIG. 1, the photosensor 101 can be a device capable of spectral detection and resolution, such as a photomultiplier tube or other detection device. The photons emitted by the scintillator crystal 107 are transmitted through the window 115 of the scintillator housing 105, through the light pipe 103, to the photosensor 101. The photosensor 101 provides a count of the photons detected, which provides data on the radiation detected by the scintillator crystal. The photosensor 101 can be housed within a tube or housing made of a material capable of withstanding and protecting the electronics of the photosensor 101, such as a metal, metal alloy or the like. Various materials can be provided within the photosensor 101, such as within the detection device housing, to stabilize the detection device during use and ensure good optical coupling with the light pipe 103 and the scintillator housing 105.

As illustrated, the light pipe 103 is disposed between the photosensor 101 and the scintillator housing 105. The light pipe 103 can facilitate optical coupling between the photosensor 101 and the scintillator housing 105. According to one embodiment, the light pipe 103 can be coupled to the scintillator housing 105 and the photosensor 101 using biasing members 117 that provide a spring resiliency. Such biasing members 117 can facilitate absorption of shocks to the detector 100 which can reduce false readings and counts during use of the device. Alternatively, the biasing members can be used in conjunction with other known coupling methods such as the use of an optical gel or bonding agent.

Figure 2:
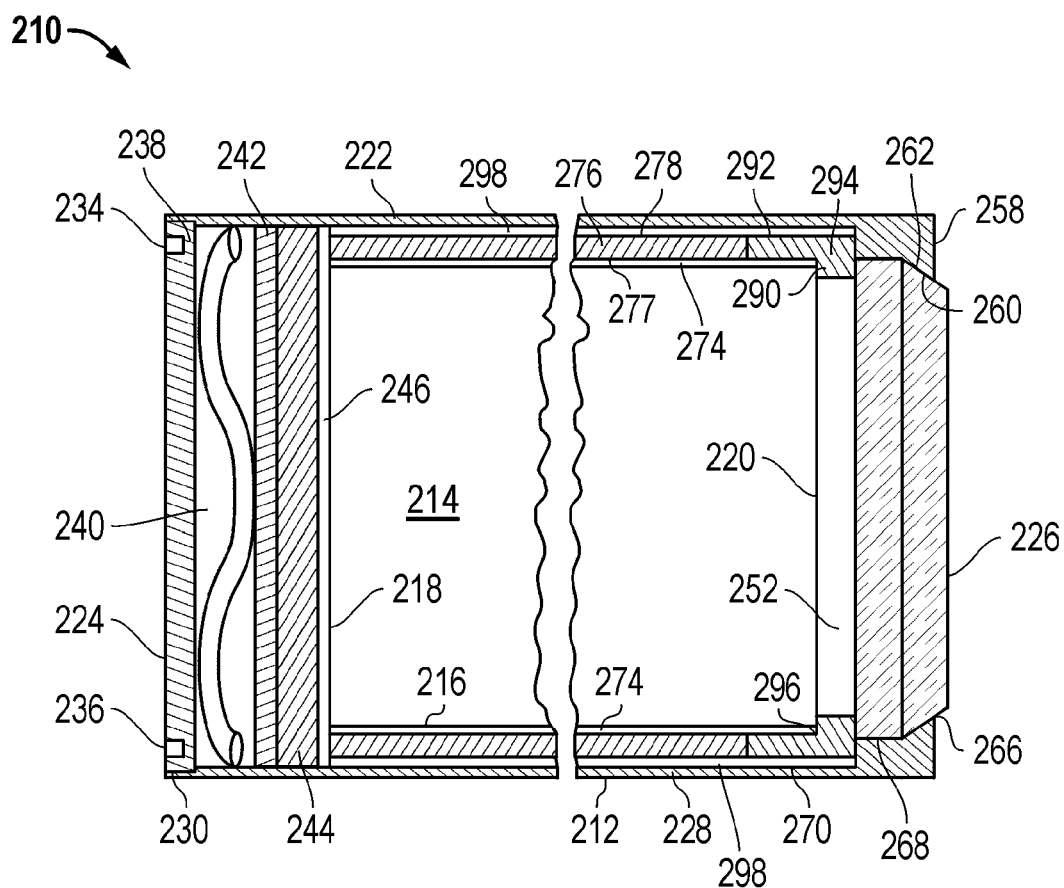
FIG. 2 includes a cross-sectional illustration of a scintillator device according to one embodiment.

In further reference to the scintillator device, FIG. 2 provides an illustration of a scintillator device 210 according to one embodiment. The scintillator device 210 includes a scintillator crystal 214 disposed within a housing 212. According to one embodiment, the scintillator crystal 214 can be an activated iodide crystal, such as a thallium-activated sodium iodide crystal. The scintillator crystal 214 can have various shapes, such as a rectangular shape, or a cylindrical shape including flat end faces 218 and 220. It will be appreciated that the surface finish of the scintillator crystal 214 can be sanded, polished, ground, etc., as desired.

In further reference to FIG. 2, the housing 212 can include a casing 222 that can be cylindrical or tubular to effectively fit the selected geometry of the scintillator crystal 214. The casing 222 can be closed at its rear end by a back cap 224 and at its front end by an optical window 226. The optical window 226 can include a material that is transmissive to scintillation light given off by the scintillator crystal 214. According to one embodiment, the optical window 226 is made of crown glass. The casing 222 and back cap 224 can be made of a non-transmissive material, such as a metal, metal alloy, or the like. As such, in one embodiment, the casing 222 and the back cap are made of stainless steel or aluminum. The back cap 224 can be coupled to the casing 222 using a sealant, mechanical fasteners, or by a vacuum type peripheral weld. According to a particular embodiment, the casing 222 can have a recess in the casing wall to form a welding flange 230, which facilitates fitting the back cap 224. Additionally, the back cap 224 can include an opening to its outer side such that annular grooves 234 and 236 are spaced slightly inwardly from the circumferential edge. Welding is performed at the outer ends of the welding flange 230 and the reduced thickness of a connecting portion 238 of welding flange 230 reduces heat conduction away from the welding flanges to permit formation of a desired weld.

The scintillator device 210 further includes a biasing member 240, a backing plate 242, a cushion pad 244, and an end reflector 246. The biasing member 240 functions to axially load the crystal 214 and bias it towards the optical window 226.

In an embodiment, the biasing member 240 is formed of a round-section wire. Suitable materials for the biasing member 240 can include a metal, a metal alloy, polymers, or the like. In an example, the biasing member 240 is formed of stainless steel.

In a particular embodiment, the biasing member 240 includes a single-turn round-section wire wave spring. For example, the biasing member 240 can include a single single-turn, round-section wire wave spring. In an embodiment, the biasing member 240 has at least 3 waves, such as at least 4 waves, or even at least 5 waves.

In a further embodiment, the biasing member 240 has advantageous spring rate and load ratio. For example, the biasing member 240 has a spring rate of at least 3000 lb/in. In particular, the spring rate can be at least 3500 lb/in, such as at least 4000 lb/in. In addition, the biasing member 240 has a load ratio, defined as the ratio of the work height to the free height, of at least 0.7. The work height of the biasing member 240 is the height of the biasing member 240 when under a load equal to its rated load. The free height is the height when the biasing member 240 is free of a load. In an example, the biasing member 240 can have a load ratio of at least 0.73, such as at least 0.77.

Returning to FIG. 2, the backing plate 242 distributes the force of the biasing member 240 across the area of the cushion pad 244 for substantially uniform application of pressure and axial loading of the rear face 218 of the scintillator crystal 214. The cushion pad 244 can typically be made of a resilient material, such as a polymer, particularly an elastomer, such as, a silicone rubber. The thickness of the cushion pad 244 can vary within a range of 0.06 to 0.30 inches for most crystals ranging in diameter from 0.25 to 3.0 inches and for crystals ranging in length from 0.5 to 15 inches.

Additionally, the cushion pad 244 can be adjacent to the end reflector 246. The end reflector 246 can include a suitable reflecting material such as a powder, like aluminum oxide (alumina) powder, or a reflective tape or foil such as, a white porous unsintered PTFE material. A porous reflective material facilitates the escape of air or gas from between the reflector film and crystal face and can avoid pockets of trapped air or gas which could prevent the end reflector 246 from being pushed by the cushion pad 244 flat against the rear end face 218 of the scintillator crystal 214, which can have a negative impact on reflectivity at the reflector-crystal interface. In an example, the reflector material is 0.010 inches thick. According to particular embodiment, the reflecting material is a film that can be wrapped at least once around the crystal and possibly two or more times as desired. Alternatively, the end reflector 246 can be a metal foil disk, which conforms to the surface of the crystal end face 218 and provides suitable reflectance toward the optical window 226.

As indicated above, the biasing member 240 exerts a force on the scintillator crystal 214, to urge the scintillator crystal 214 towards the optical window 226 thereby maintaining suitable optical coupling between the scintillation crystal 214 and the optical window 226. An interface pad 252 optionally can be provided between the scintillator crystal 214 and the optical window 226 to facilitate effective optical coupling. According to one embodiment, interface pad 252 can include a transparent polymer material, such as a transparent silicone elastomer. The thickness of the interface pad 252 can be within a range of 0.06 to 0.30 inches for crystals ranging in diameter from 0.25 to 3.0 inches and in length from 0.5 to 15 inches.

In further reference to FIG. 2, as illustrated, the optical window 226 can be retained in the casing 222 by an annular lip 258 at the front end of the casing 222. The annular lip 258 can protrude radially inwardly from the casing wall 228 and can define an opening having a diameter less than the diameter of the optical window 226. Additionally, the annular lip 258 can have an inner beveled surface 260 and the optical window 226 can include a corresponding beveled, circumferential edge surface 262 that engages the inner beveled surface 260. The mating beveled surfaces can be hermetically sealed by a high temperature solder such as 95/5 or 90/10 lead/tin solder. The solder also aids in restraining the optical window 226 against axial push-out, in addition to providing a high temperature seal. The optical window 226 can be axially trapped between the annular lip 258 and the scintillator crystal 214 such that it can be radially constrained by the casing wall 222. Optionally, to permit wetting of the optical window 226 by the solder, the sealing edge surfaces of the optical window 226 can include a metalized coating such as platinum.

According to the illustrated embodiment of FIG. 2, the inner beveled surface 260 can forwardly terminate at a cylindrical surface 266 and rearwardly at a cylindrical surface 268. The cylindrical surface 268 closely surrounds a portion of the optical window 226 and extends axially inwardly to a cylindrical surface 270, which extends axially to the flange 230 at the opposite end of the casing 222. The interface of the optical window 226 is aligned with the annular shoulder formed between the cylindrical surfaces 268 and 270.

According to another embodiment, the scintillator crystal 214 at its surface 216 can be substantially surrounded by a reflector 274. The reflector 274 can incorporate materials as described above in accordance with the end reflector 246, such as a porous material including a powder, foil, metal coating, or polymer coating. According to one embodiment, the reflector 274 is a layer of aluminum oxide (alumina) powder. In another embodiment, the reflector 274 is a self-adhering white porous PTFE material. As noted above, air or gas that might otherwise be trapped between the end reflector 246 and the scintillator crystal 214 can escape through the porous reflector 274.

In one embodiment, the reflector 274 can be substantially surrounded by a liner (not illustrated) disposed between the outer surface of the reflector 274 and the inner surface 277 of a shock absorbing member 276. Such a liner can include a metal material, particularly a thin metal liner such as a foil. In accordance with a particular embodiment, the coating material can include aluminum foil.

In accordance with a particular embodiment, the reflector 274 is a preformed sheet containing a fluorinated polymer. In one embodiment, the fluorinated polymer can include a fluorine substituted olefin polymer comprising at least one monomer selected from the group consisting of vinylidene fluoride, vinylfluoride, tetrafluoroethylene, hexafluoropropylene, trifluoroethylene, chlorotrifluoroethylele, ethylene-chlorotrifluoroethylene, and mixtures of such fluoropolymers. In one particular embodiment, the reflector 274 is made essentially of a fluorinated polymer. In another more particular embodiment, the reflector 274 is made essentially of polytetrafluoroethylene (PTFE).

In addition to the reflector 274 surrounding the scintillator crystal 214, a shock absorbing member 276, can substantially surround the scintillator crystal 214. The shock absorbing member 276 can surround and exert a radial force on the reflector 274 and the scintillator crystal 214. As shown, the shock absorbing member 276 can be cylindrical to accompany the selected shape of the scintillator crystal 214. The shock absorbing member 276 can be made of a resiliently compressible material and according to one embodiment, is a polymer, such as an elastomer. Additionally, the surface contour of the shock absorbing member 276 can vary along the length to provide a frictionally engaging surface thereby enhancing the stabilization of the scintillator crystal 214 within the casing 222. For example, the shock absorbing member 276 can have a uniform inner surface 277 and an outer surface 278, or optionally, can have ribs extending axially or circumferentially on the inner surface 277, the outer surface 278, or both. Still, the shock absorbing member 276 can have protrusions, dimples, or other shaped irregularities on the inner surface 277, the outer surface 278, or both surfaces to frictionally engage the scintillator crystal 214 and the casing 222. The shock absorbing member is discussed in more detail below.

As also illustrated, the scintillator device 210 can include a ring 290 that extends from the front end of the shock absorbing member 276 to the optical window 226. The ring 290 facilitates stabilization and alignment of the circular interface pad 252 during assembly of the scintillator device 210. The ring 290 has an axially inner end portion 292 substantially surrounding the scintillator crystal 214 and an axially outer end portion 294 substantially surrounding the interface pad 252. The intersection of the interior surfaces of the axially inner end portion 292 and the axially outer end portion 294 can include a shoulder 296, which facilitates positioning of the ring 290 on the scintillator crystal 214 during assembly.

In certain embodiments, the ring 290 can be made of resilient material, including an organic material, such as an elastomer. In one particular embodiment, the ring 290 is in direct contact with the inner surface of the casing 222 and the outer surface of the scintillator crystal 214, but may not necessarily provide a hermetically sealing interface between the scintillator crystal 214 and the shock absorbing member 276.

Moreover, the ring 290 can include additional materials, generally located within the inner surface and abutting the scintillator crystal 214 to enhance the reflection of the ring 290. Such materials can include, for example, alumina or PTFE (Teflon™). The ring 290 and the shock absorbing member can alternatively be integrated together as a continuous integral component.

In further reference to the components of the scintillator device 210 as illustrated in FIG. 2, a sleeve 298 extends longitudinally from the optical window 226 to approximately the back cap 224. The sleeve 298 can substantially surround the shock absorbing member 276 and scintillator crystal 214 and in a compressed state (when fitted within the casing 222) provides a radially compressive force to the shock absorbing member 276 and scintillator crystal 214. According to one embodiment, insertion of the sleeve 298 into the casing 222 requires compression of the sleeve thereby providing a radially compressive force on the crystal 214. Suitable materials for the sleeve 298 include materials, such as a metal, metal alloy, a polymer, carbon or the like. Additionally, the sleeve 298 can include a material that has a lower coefficient of friction with the material of the casing 222 than does the material of the shock absorbing member 276 with the material of the casing 222.

Figure 3:
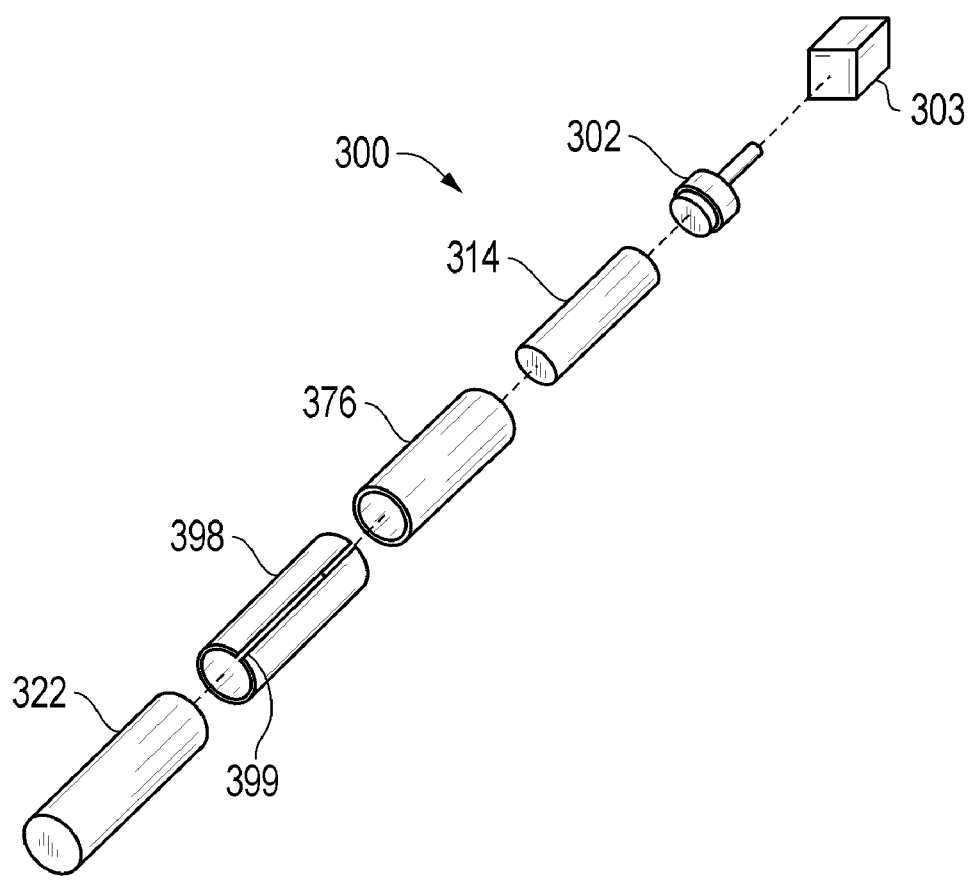
FIG. 3 includes an exploded view of a scintillator device according to one embodiment.

In further reference to the sleeve 298 and its incorporation into the scintillator device 210, FIG. 3 provides an exploded view 300 of the arrangement of the component layers of the scintillator device according to one embodiment. As illustrated in FIG. 3, the sleeve 398 can be slotted along its longitudinal length, thereby providing a longitudinally extending gap 399. The width of the longitudinally extending gap 399 when the shock absorbing member 376 is disposed within the sleeve 398 without any externally applied compression can vary, and can generally be wide. However, when a radially compressive force is applied and the sleeve 398 and shock absorbing member 376 are inserted into the casing 322, the width of the longitudinally extending gap 399, can be zero or near zero. The sleeve 398 can be compressible in other suitable ways, for example, the sleeve 398 can be fluted or crimped to allow for radial compression of the sleeve 398 along its axial length.

In further reference to the sleeve 398, the thickness of the sleeve 398 along the longitudinal direction can be selected thereby providing for controlled radial loading along the length of the scintillator crystal 314. To increase or decrease the amount of radial loading the thickness of the sleeve 398 can be increased or decreased accordingly, wherein a thicker sleeve increases the radial loading on the scintillator crystal 314 and a thinner sleeve decreases the radial loading on the scintillator crystal 314.

FIG. 3 further provides a particular assembly of the scintillator device 300 according to one embodiment. After applying a reflector to the scintillator crystal 314, the subassembly of the reflector and scintillator crystal 314 can be inserted into the shock absorbing member 376 and this subassembly can be inserted in the sleeve 398 to form a scintillator crystal 314-shock absorbing member 376-sleeve 398 subassembly. Before insertion of such a subassembly into the casing 322, the sleeve 398 can be in an uncompressed state, and the diameter of the sleeve 398 can be greater than the inside diameter of the metal casing 322. A radial compressive force can be applied to the scintillator crystal 314-shock absorbing member 376-sleeve 398 subassembly during insertion into the casing 322. To facilitate insertion, a forcing mechanism 302 can be used. The forcing mechanism 302, can apply an axial force to the scintillator crystal 314-shock absorbing member 376-sleeve 398 subassembly, and can include devices such as a hydraulic ram or push rod 302 coupled to a conventional control apparatus 303.

Figure 4:
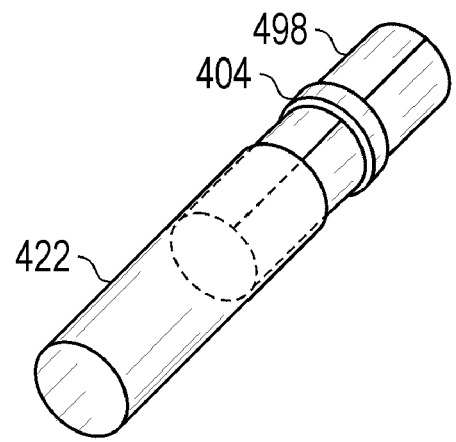
FIG. 4 includes a perspective diagram of a portion of a scintillator device according to one embodiment.

Referring to FIG. 4, the incremental compression of the scintillator crystal 314-shock absorbing member 376-sleeve 398 subassembly (illustrated in FIG. 3 and denoted 498) during insertion into the casing 422 can be facilitated by use of a clamp 404. The clamp can include various devices capable of exerting a radially compressive force, such as a radial clamp or compression ring. The clamp 404 can be adjusted to change positions along the longitudinal length of the subassembly 498 during insertion of the subassembly 498 into the casing 422. The size of the clamp 404 can depend upon the size of the subassembly 498 and the rigidity of the sleeve 398 and the desired compressive force suitable for effective insertion of the subassembly 498 into the casing 422. Additionally, the axial rigidity of the sleeve 398 can impact the location at which the radial clamp 404 is applied to the sleeve 398. Accordingly, the subassembly 498 can be progressively inserted at increments ranging from 0.25 inches to 1.0 inch, or more.

In further reference to the coupling of the components of the subassembly 498 within the casing 422, the sleeve 398/casing 422 interface has a reduced coefficient of friction relative to the coefficient of friction of a typical casing 422/shock absorbing member 376 interface which would exist without the sleeve 398. As such, the reduced coefficient of friction facilitated by incorporation of a sleeve 398 to form a sleeve 398/casing 422 interface facilitates assembly of the device and reduces the potential for damage to the components of the subassembly 498. Moreover, provision of the sleeve 398/casing 422 interface provides a suitable radial loading for stabilization of the device during operation.

Provision of a scintillator device in accordance with the embodiments described herein is suitable for reducing vibration induced counts associated with the harsh environmental conditions of industrial applications, particularly in drilling applications. Suitable biasing and stabilization (both axial and radial stabilization) of the scintillator device in combination with select materials of component parts reduces vibration induced counts, and enhances the accuracy and precision of the scintillator device. The enhanced radial and axial stabilization and stiffness may cause vibration induced counts to occur at higher excitation frequencies, such as at frequencies above a threshold frequency, i.e., above the operational dynamic bandwidth of the detector. Accordingly, fewer vibrations to the scintillator device are capable of causing the necessary frequency to cause a vibration induced count and therefore vibration induced counts are reduced.

According to one aspect, a scintillator device is provided that includes a scintillator crystal and a shock absorbing member surrounding the scintillator crystal. Notably, the scintillator device includes a shock absorbing member, such as shock absorbing member 276 (See FIG. 2), which generally provides a resilient housing for the scintillator crystal and substantially surrounds the crystal during use in industrial applications. The shock absorbing member is generally formed of a resilient material, such as a polymer or composite compound. According to a particular embodiment, the shock absorbing member is made of a silicone material.

According to one embodiment, the tensile strength of the material of the shock absorbing member is generally not less than 2.5 MPa, not less than 3.0 MPa, not less than 4.0 MPa, or not less than 5.0 MPa. According to a particular embodiment, the strength can be even greater, depending upon the desired application, such that the tensile strength of the material of the shock absorbing member is not less than 6.0 MPa. According to one particular embodiment, the tensile strength of the material of the shock absorbing member is within a range between 2.5 MPa and 12 MPa, or more particularly within a range between 3.0 MPa and 10 MPa. Material of such tensile strength in combination with above discussed components can provide a suitable shock absorbing housing for the scintillator crystal useful in industrial applications.

Unlike conventional designs, the shock absorbing member of the present disclosure can be stiffer, thus having a greater hardness. In one embodiment, the shock absorbing member can have a measured Shore A hardness of at least 25. In other embodiments, the shock absorbing member can be stiffer, such that it has a Shore A hardness of at least 30, at least 35, at least 40, or even at least 45. Still, according to one embodiment, the Shore A hardness of the shock absorbing member is within a range between 30 and 70, and more particularly within a range between 40 and 60.

It will be appreciated that the material of the shock absorbing member can also be incorporated into other components within the scintillator device. Accordingly, such a material can also be incorporated into other padding components such as the interface pad, cushion pad, or alternatively light transmitting components, such as the light pipe (illustrated in FIG. 1).

In one embodiment, the scintillator device can include an interface pad disposed adjacent the scintillator crystal, typically at one end of the scintillator crystal. In further reference to particular components of the scintillator device, a cushion pad can be included within the housing, typically at one end of the housing, typically at one end of the scintillator crystal, such as between the scintillator crystal and a biasing member. The material of the cushion pad can include a material having a filler. The filler typically includes a colloidal ceramic powder, such as alumina or silica, which in some situations facilitates the formation of a thixotropic material for working purposes. Additionally, in one embodiment, the cushion pad has a Shore A hardness of at least 25. In certain other embodiments, the cushion pad has a greater Shore A hardness, such as a hardness of at least 30, or at least 40, or at least 50. In one particular embodiment, the hardness of the cushion pad is within a range of between 30 and 70, such as within a range of between 40 and 60. Use of silicone, such as LSR (liquid silicone rubber), in combination with the particularly low volatility characteristics represents a particularly desirable combination.

Figure 5:
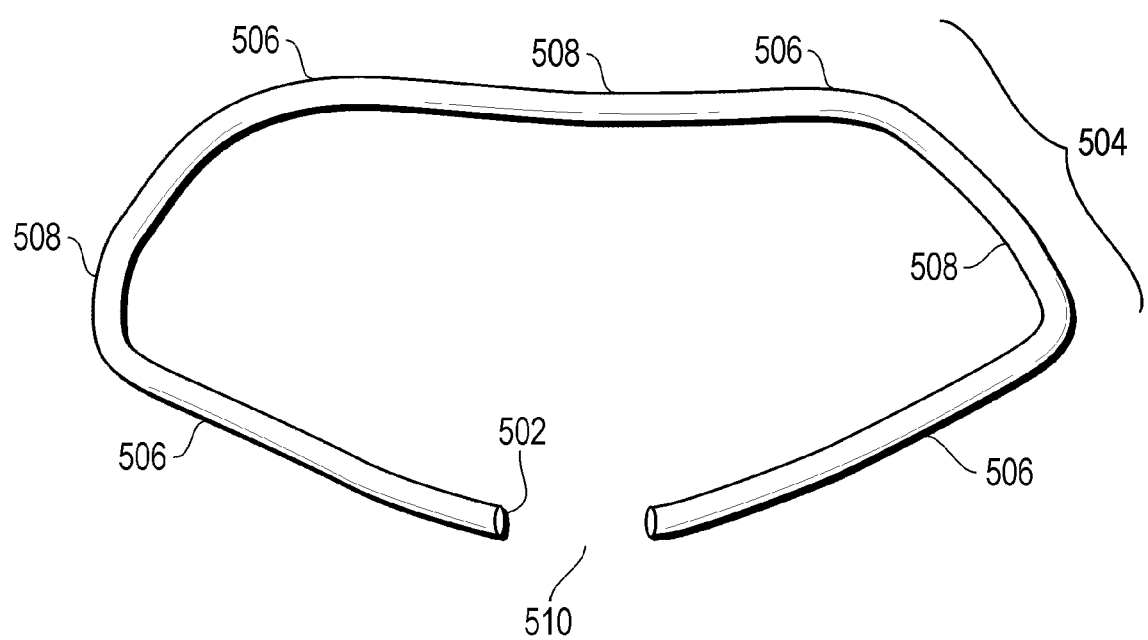
FIG. 5 includes an illustration of a single turn round wire biasing member according to one embodiment.

Turning to FIG. 5, a single-turn, round-section wire wave spring 500 is illustrated. The cross-section 502 is round. In particular, the cross-section can be circular or ovular, in contrast to rectangular or flat. In an example, the diameter of the rounded cross-section 502 is in a range of 0.02 in to 0.2 in, such as a range of 0.03 in to 0.015 in. Further, the wave spring 500 includes a single turn terminating in a gap 510.

Further, the spring 500 includes waves, such as wave 504. A wave extends from peak to peak (e.g., peaks 506) through a valley (e.g., valley 508). When free of a load, the distance extending from the underside of the wire in the valley 508 to the top side of the wire at the peak 506 defines the free height. When under a load equivalent to the spring's rating, the distance extending between such points is the work height. The ratio of the work height to the free height is the load ratio. In an example, the spring 500 exhibits a load ratio of at least 0.7, such as at least 0.73, or even 0.77.

In an additional example, the spring 500 exhibits a desirable spring rate, defined as the gradient of the force versus deflection curve, of at least 3000 lb/in. For example, the spring rate can be at least 3500 lb/in, such as at least 4000 lb/in.

In the context of detectors, the embodiments described herein provide advantageous technical features. For example, vibration induced false counts are unexpectedly reduced and sensitivity is increased in a scintillator device having the same housing dimensions. It is believed that such a reduction is related to the nature of the embodiments of the biasing member described herein. For example, the single-turn, round-section wire wave spring is understood to provide a high spring rate and load ratio in a low profile, while still providing enough change in height to accommodate thermal expansion. Further, the reduced free height and work height permit use of a larger (i.e., longer) scintillator crystal, further improving device performance.

Such advantageous features are particularly relevant for ruggedized detectors. A ruggedized detector is rated for high temperature environments and high vibration and shock conditions. In particular, a ruggedized detector is rated for use at temperatures to at least 185° C., such as at least 190° C. Further, a ruggedized detector is rated for shock of at least 800 G at 1 ms, such as at least 900 G or even as high as 1000 G, when tested in accordance with Mil-STD-810E Method 516.4 using a pneumatic shock machine available from Avex. The ruggedized detector is also rated for random vibration of at least 15 G(rms) at 30-1000 Hz, such as 20 G(rms), and periodic vibration of at least 20 G(peak) at 30-1000 Hz, such as 30 G(peak), when measured in accordance with Mil-STD-810E Method 514.4 using an electrodynamic shaker available from Unholtz-Dickie or LDS.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A detector comprising:
   a scintillator crystal having a front face and a rear face;
   a backplate disposed proximal to the rear face of the scintillator crystal; and
   a biasing member disposed proximal to the backplate and applying a biasing force to the backplate, the backplate applying a biasing force to the scintillator crystal in a direction toward the front face, the biasing member comprising a single-turn, round-section wire wave spring, wherein the biasing member has a spring rate of at least 3000 lb/in.

2. The detector of claim 1, wherein the single-turn, round section wire wave spring has a gap.

3. The detector of claim 1, further comprising a reflector disposed between backplate and the rear face of the scintillator crystal.

4. The detector of claim 1, wherein the spring rate is at least 3500 lb/in.

5. The detector of claim 1, wherein the biasing member has a load ratio of at least 0.7.

6. The detector of claim 5, wherein the load ratio is at least 0.73.

7. The detector of claim 1, further comprising a window proximal to the front end of the scintillator crystal, the scintillator crystal biased toward the window.

8. The detector of claim 7, further comprising an optical pad disposed between the window and the scintillator crystal.

9. The detector of claim 1, wherein the biasing member has at least 3 waves.

10. A detector comprising:
   a scintillator crystal having a front face and a rear face;
   a backplate disposed proximal to the rear face of the scintillator crystal; and
   a biasing member disposed proximal to the backplate and applying a biasing force to the backplate, the backplate applying a biasing force to the scintillator crystal in a direction toward the front face of the scintillator crystal, the biasing member having a spring rate of at least 3000 lb/in and a load ratio of at least 0.7.

11. The detector of claim 10, wherein the biasing member comprises a single-turn, round-section wire wave spring.

12. The detector of claim 10, further comprising a reflector disposed between backplate and the rear face of the scintillator crystal.

13. The detector of claim 10, wherein the spring rate is at least 3500 lb/in.

14. The detector of claim 10, wherein the load ratio is at least 0.73.

15. The detector of claim 10, further comprising a window proximal to the front end of the scintillator crystal, the scintillator crystal biased toward the window.

16. The detector of claim 15, further comprising an optical pad disposed between the window and the scintillator crystal.

17. The detector of claim 10, wherein the biasing member has at least 3 waves.

18. A detector comprising:
   a housing defining a cavity and having a front end and a back end, the housing defining an opening in the front end, the back end being closed;
   a window disposed within the opening of the front end of the housing and defining a light path from the cavity;
   a scintillator crystal having a front face and a rear face, the front face disposed proximal to and biased toward the window;
   a reflector disposed on the rear face of the scintillator crystal;
   a backplate disposed proximal to the reflector;
   a cushioning pad disposed between the backplate and the reflector; and
   a biasing member disposed proximal to the backplate and applying a biasing force to the backplate toward the cushioning pad and the rear face of the scintillator crystal, the biasing member comprising a single-turn, round-section wire and having a spring rate of at least 3000 lb/in and a load ratio of at least 0.7.

19. The detector of claim 18, further comprising an optical pad disposed between the window and the scintillator crystal.

* * * * *